JAMES T. WHIPPLE, OF CHICAGO, ILLINOIS.

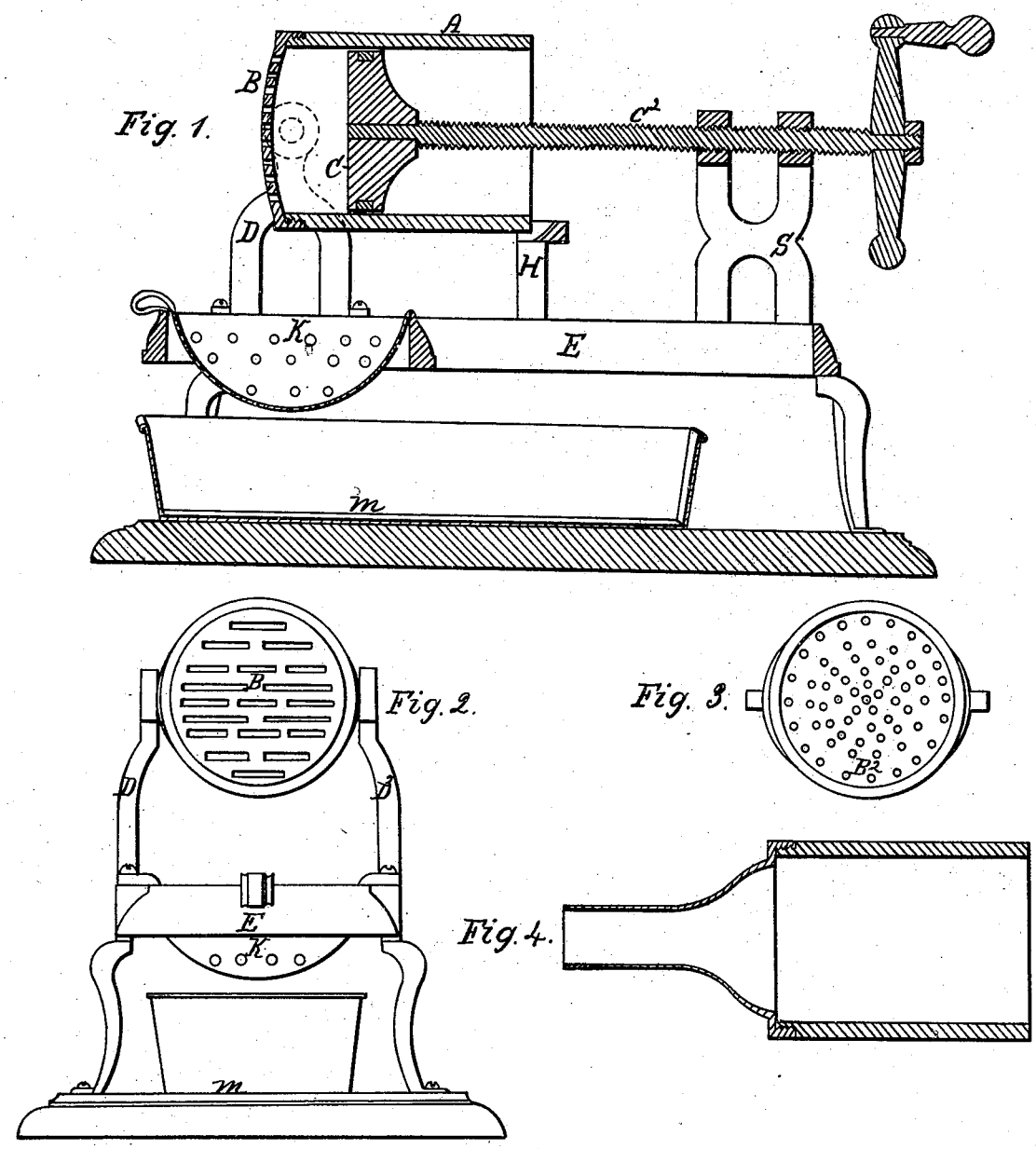

Letters Patent No. 85,551, dated January 5, 1869.

IMPROVEMENT IN BUTTER-WORKER, &c.

The Schedule referred to in these Letters Patent and making part of the same.

*To whom it may concern:*

Be it known that I, JAMES T. WHIPPLE, of Chicago, in the county of Cook, and State of Illinois, have invented a new and useful Improvement in Butter-Workers and Fruit-Presses; and I do hereby declare the following to be a full, clear, and exact description thereof, reference being had to the accompanying drawings, in which—

Figure 1 is a vertical longitudinal central section through the same;

Figure 2 is a vertical transverse section; and

Figure 3 is an end view of the disk employed in pressing fruit.

Similar letters of reference, where they occur in the separate figures, denote like parts in both the drawings.

My invention consists—

First, in providing a cylinder with a slotted disk, through which the butter is forced, whereby all the particles of milk are extracted; and Second, in the novel manner of its construction, whereby it may be readily changed from a butter-worker to operate as a fruit-press, as will be hereinafter more fully explained by the description thereof.

To enable others skilled in the art to fully understand, construct, and use my invention, I will proceed to describe the same, with reference to the drawings.

A represents a cylindrical case, which may be constructed of wood, glass, or metal. Said case is placed in a horizontal position, or may be placed at any oblique position, as found most advantageous, one end of which is supported by standard H, which extends across from side to side of the frame-work E.

The opposite end of said case is provided with a metal disk, B, which has, at opposite sides, bearings protruding outward, which take into or rest within the upper end of standards D and D², thus allowing said case to be tilted upward to a vertical position.

Within said case is a follower, C, so arranged as to closely fill the same, or may be provided with suitable packing. Said follower is connected to screw C², which passes through the upper end of standard S, attached to frame E. Said disk B is provided with a system of slots, as shown in the drawings by fig. 2.

K represents a perforated dish or strainer, suspended within the end of frame E, to receive the butter as it is forced through said slots in disk B, the buttermilk passing through said strainer K into dish M.

The operation of my invention, in working butter, is as follows:

Case A is turned to a vertical position and filled. Said case is then allowed to drop down and rest upon standard H. Follower C is forced through the case A by means of screw C²; thus the butter is pressed through the slots in disk B, by which process all the particles of milk are extracted, rendering the butter capable of being kept for a great length of time.

In the drawings, fig. 3 represents a second disk, B², which is also perforated in any suitable manner. Said disk is so constructed as to fit case A, and is used thereon for pressing fruit in a like manner as disk B for working butter.

Having thus described the nature and object of my invention,

What I claim as new, and desire to secure by Letters Patent, is—

1. Case A, in combination with disk B, arranged to operate substantially in the manner and for the purpose set forth.

2. The combination of disk B², case A, follower C, and screw C², arranged to operate substantially as and for the purpose specified.

JAMES T. WHIPPLE.

Witnesses:
E. M. JONES,
WM. C. SPAFFORD.